United States Patent [19]

Tolliver et al.

[11] Patent Number: 5,491,021

[45] Date of Patent: Feb. 13, 1996

[54] TRUCK TRAILER COVER HAVING A HIGH STRENGTH NON-CHLORINATED MULTI-LAYERED POLYMERIC ARTICLE

[75] Inventors: Howard R. Tolliver; Terry R. Bailey, both of Woodbury, Minn.

[73] Assignee: Minnesota Mining and Manufacturing Company, St. Paul, Minn.

[21] Appl. No.: 447,305

[22] Filed: May 22, 1995

Related U.S. Application Data

[62] Division of Ser. No. 82,037, Jun. 24, 1993.

[51] Int. Cl.$^6$ .................................. B60R 13/00
[52] U.S. Cl. ..................... 428/217; 428/246; 428/245; 428/261; 428/289; 428/290; 428/262; 428/284; 428/286; 428/260; 428/220; 428/247; 428/339; 428/523; 296/98; 296/136; 296/100; 296/105; 296/210; 296/900; 296/901
[58] Field of Search ........................... 428/31, 246, 245, 428/261, 289, 290, 262, 284, 286, 260, 217, 220, 246, 247, 339, 523; 296/98, 136, 100, 105, 210, 900, 901

[56] References Cited

U.S. PATENT DOCUMENTS

| | | | |
|---|---|---|---|
| 2,299,807 | 10/1942 | Dunbar | 8/136 |
| 3,125,462 | 3/1964 | Rachinsky | 117/139.5 |
| 3,660,218 | 5/1972 | Shepherd et al. | 161/87 |
| 3,687,764 | 8/1972 | Rogosch et al. | 156/182 |
| 3,703,779 | 11/1972 | Goldman | 40/135 |
| 4,351,876 | 9/1982 | Doi et al. | 428/349 |
| 4,416,937 | 11/1983 | Metzger | 428/286 |
| 4,471,018 | 9/1984 | Kritchevsky et al. | 428/220 |
| 4,490,934 | 1/1985 | Knapp | 40/603 |
| 4,531,994 | 7/1985 | Holtron et al. | 156/307.3 |
| 4,592,158 | 6/1986 | Seely | 40/603 |
| 4,621,003 | 11/1986 | O'Kane | 428/71 |

(List continued on next page.)

FOREIGN PATENT DOCUMENTS

| | | |
|---|---|---|
| 0399439A2 | 11/1990 | European Pat. Off. |
| 0584651A3 | 4/1994 | European Pat. Off. |
| 2922242A1 | 4/1981 | Germany. |
| 50-61475 | 5/1975 | Japan. |
| 60-52950 | 11/1985 | Japan. |
| 2247859A | 3/1992 | United Kingdom. |

OTHER PUBLICATIONS

Derwent Publications Ltd., London, Week 7729, AN 77–51387Y and JP A, 52 069 486 (Mitsui Polychem. KK).
Dow Chemical Company product literature on Attane™ Copolymers.
Chevron Chemical Company product literature on EMAC resins.
Chevron Chemical Company product literature on Ethylene–Methyl Acrylate Copolymer Family of Resins.
Quantum Chemical Corp. product literature on Enathene™ Ethylene n–Butyl Acrylate Copolymers.
U.S.I. Chemicals product literature on Petrothene™, Ultrathene™, and Vynathene™ copolymers.
DuPont Company product literature on Alathon™ ethylene ethyl acrylate copolymer resins.

Primary Examiner—George F. Lesmes
Assistant Examiner—Kathleen L. Choi
Attorney, Agent, or Firm—Gary L. Griswold; Walter N. Kirn; Karl G. Hanson

[57] ABSTRACT

A truck trailer cover 40 includes a multi-layered article 10 that is dimensioned and adapted to be fitted over and secured to a truck trailer 42. The multi-layered article, 10 includes a fabric 12 having a polymeric sheet 14, 16 secured to each side of the fabric 12. Each polymeric sheet 14, 16 secured to the fabric 12 has two non-chlorinated polymeric layers. The first non-chlorinated polymeric layer A, A' is disposed on the inner side of each sheet and contains an ethylene copolymer that has a Shore A hardness less than 85. The second non-chlorinated polymeric layer B, B' is disposed on the outer side of each sheet and contains a polymer having a Shore A hardness greater than 85. The multi-layered article 10 demonstrates good flex-crack resistance to make it suitable for use in a roll-up sign 30 or a truck trailer cover 40.

20 Claims, 2 Drawing Sheets

U.S. PATENT DOCUMENTS

| | | | |
|---|---|---|---|
| 4,636,427 | 1/1987 | Ohno et al. | 428/246 |
| 4,664,966 | 5/1987 | Bailey et al. | 428/203 |
| 4,694,601 | 9/1987 | Dicke et al. | 40/610 |
| 4,767,659 | 8/1988 | Bailey et al. | 428/203 |
| 4,844,958 | 7/1989 | Chapman et al. | 428/36.1 |
| 4,896,943 | 1/1990 | Tolliver et al. | 350/105 |
| 4,897,136 | 1/1990 | Bailey et al. | 156/145 |
| 4,935,276 | 6/1990 | Pawlowski et al. | 428/35.7 |
| 4,980,984 | 1/1991 | Kulp et al. | 40/610 |
| 4,983,436 | 1/1991 | Bailey et al. | 428/40 |
| 4,999,938 | 3/1991 | Behling | 40/610 |
| 5,016,372 | 5/1991 | Gold | 40/591 |
| 5,061,572 | 10/1991 | Hamada et al. | 428/516 |
| 5,175,646 | 12/1992 | Eden | 359/536 | ized PVC-containing article.

TRUCK TRAILER COVER HAVING A HIGH STRENGTH NON-CHLORINATED MULTI-LAYERED POLYMERIC ARTICLE

This is a division of U.S. Ser. No. 08/082,037, filed Jun. 24, 1993 now allowed.

TECHNICAL FIELD

This invention pertains to a flexible multi-layered, non-chlorinated polymeric article and to a roll-up sign and truck cover which employ such a multi-layered article.

BACKGROUND OF THE INVENTION

Flexible articles have been disclosed which comprise a fabric having a plasticized PVC layer secured to each side of the fabric. These articles have been shown to demonstrate relatively good flex-crack resistance—a property that relates to the articles ability to withstand repeated flexing at ambient temperatures, particularly low ambient temperatures. Flexible PVC-containing articles also have demonstrated good resistance to weathering, have exhibited an ability to be easily colored throughout the polymer, and an ability to be inked on the outer surface. These properties, coupled with the relative low cost of PVC, have promoted the widespread use of flexible PVC-containing articles. Some of the many utilities for flexible PVC-containing articles include a fitted cover dimensioned for use on a truck or truck trailer, outdoor banners, awnings, upholstering, and a backing for a retroreflective roll-up sign (see e.g. U.S. Pat. No. 5,175,646). Although the flexible PVC-containing articles have gained tremendous widespread use, from an environmental standpoint these articles may not be so desirable.

As landfill sites are becoming less common, there is a greater tendency to dispose of articles that contain PVC through incineration. The incineration of PVC can produce hydrochloric acid. It is feared that the hydrochloric acid enters the atmosphere and produces acid rain. It also is feared that dioxins and furans are liberated when PVC is burned at municipal incinerators. Discussions are underway in many nations to ban PVC because of its potentially harmful effect on the environment. See generally K. Kreisher, PVC is a Good Bet to Survive its Global Environmental Travails, *Modern Plastics* 60–64 (June 1990); The Ministry of Environmental Protection Letter of 20.10. 1988 to the Danish Parliament's Environmental Committee; and E. Chynoweth et al., Green Pressures Force PVC to Take LCA Lead in Europe, *Chemical Week* 41–42 (Nov. 18, 1992).

In addition to its environmental problems, flexible PVC-containing articles also pose the problem of having a low molecular weight plasticizer migrate to the surface of the PVC layer. The PVC layer typically contains a low molecular weight plasticizer to impart flexibility to the layer over a wide range of temperatures. This plasticizer is fairly mobile in the PVC layer and usually migrates out of the article, leaving it with a semi-tacky outer surface onto which dirt and other particles can adhere. The migration of the plasticizer also can cause the PVC article to be less flexible, it can allow the plasticizer to enter other articles that are adjacent to the PVC article, and it can interfere with the application of an ink on the surface of the article. Further, the most common plasticizer for flexible PVC is carcinogenic to laboratory animals, although a direct link to humans has not been proved. See supra Kreisher at 60. Although high molecular weight plasticizers may be used, which do not migrate out from the interior of the PVC layer, these plasticizers do not impart good flex crack resistance to the PVC-containing article.

Articles are known which comprise fabrics secured to polymeric layers that contain polymers other than PVC. Examples of such articles have been disclosed in the following documents: U.S. Pat. Nos. 4,844,958, 4,636,427, 4,531,994, 4,471,018, 4,351,876, 3,125,462, 2,299,807; EP-A 0,399,439 A2; and Japanese Patent Kokoku 60-52950. None of these documents, however, disclose that their articles demonstrate good flex-crack resistance so as to be a suitable alternative for a plasticized, PVC-containing article. In U.S. Pat. No. 3,703,779 a translucent card is disclosed that comprises a piece of paper laminated between two sheets Of plastic. Each plastic sheet includes two polymeric layers, an inner layer of polyethylene and an outer layer of polyester. It is doubtful that this laminated article is very flexible or that it has good flex-crack resistance or good tear strength because it employs a piece of paper for the central structural layer.

Roll-up signs are well known in the outdoor display and traffic control materials art. These signs are portable and can be folded or rolled up for transport and storage until being used again in a non-rolled up or extended condition. Examples of roll-up signs are shown in U.S. Pat. Nos. 5,175,646, 5,016,372, 4,999,938, 4,980,984, 4,694,601, 4,592,158, 4,490,934, and UK Patent Application GB 2,247, 859 A. The signs typically comprise a retroreflective layer having an indicia on the front side and a PVC coated fabric on the back side. In U.S. Pat. No. 5,016,372, a roll-up sign is disclosed that is made of polyethylene plastic.

SUMMARY OF THE INVENTION

The present invention alleviates the problems posed by flexible, PVC-containing articles by providing a multi-layered article that comprises: (i) a fabric having first and second sides; and (ii) a first sheet disposed on the first side of the fabric, and a second sheet disposed on the second side of the fabric, the first sheet comprising polymeric layers A and B and the second sheet comprising polymeric layers A' and B', wherein: polymeric layers A and A' each include a non-chlorinated, copolymer that contains ethylene units and has a Shore A hardness less than 85; polymeric layers B and B' each include a non-chlorinated polymer having a Shore A hardness greater than 85; and polymeric layers A and A' are disposed between the porous fabric and layers B and B', respectively.

A multi-layered article of this invention demonstrates good flex-crack resistance and also substantially minimizes dirt adherence, but it does not employ a chlorine-containing polymer and as such provides an environmentally-friendly substitute for a flexible PVC-containing article. An article of the invention also does not need to employ a low molecular weight plasticizer to impart flexibility. This enables an article of this invention to avoid the problems that are associated with the use of such a plasticizer. An article of the invention also can be colored and made resistant to weathering, and inks can be applied to the outer surface to display messages. These properties make the article of the invention particularly suitable as a replacement for flexible PVC-containing articles.

The above and other features and advantages of the invention are more fully shown and described in the drawings and detailed description of this invention, where like reference numerals are used to represent similar parts. It is

DETAILED DESCRIPTION OF THE PREFERRED EMBODIMENTS

In describing the preferred embodiments of the invention, specific terminology will be used for the sake of clarity. The invention, however, is not intended to be limited to the specific terms so selected, and it is to be understood that each term so selected includes all the technical equivalents that operate similarly.

Figure 1:
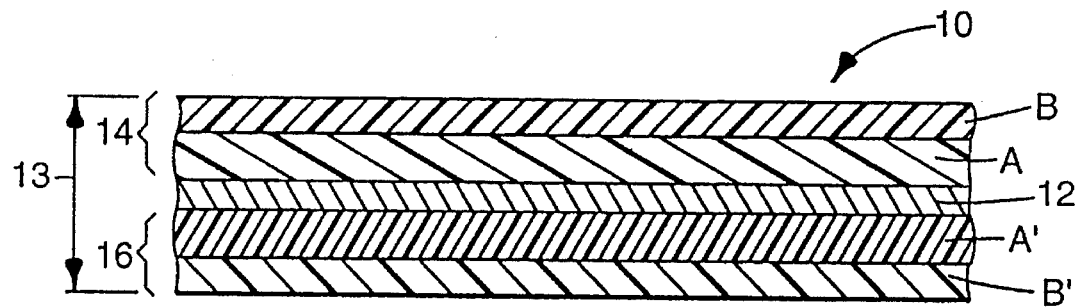
FIG. 1 is a cross section of a multi-layered article 10 in accordance with the present invention.

FIG. 1 illustrates an example of a multi-layered article 10 of the invention. Multi-layered article 10 comprises a fabric 12 having first and second polymeric sheets 14 and 16 disposed on first and second sides of fabric 12. Sheets 14 and 16 include polymeric layers A and A' and polymeric layers B and B'. Polymeric layers B and B' are secured to polymeric layers A and A', respectively, on a side opposite the side making contact with fabric 12. Multi-layered article 10 is in sheet form; that is, a first dimension 13 is very small relative to the second and third dimensions. Multi-layered article 10 typically is about 100 to 2,000 micrometers thick in the first dimension 13, more typically 200 to 1,000 micrometers thick. The article 10 can have a tensile strength in the range of about 100 to 2000 Newtons (N), and can often exceed 400 N. The term "tensile strength" means the tensile strength measured according to Federal Standard 191 method 5100 (Jul. 20, 1978). Article 10 preferably has a tear strength of at least 50 N, more preferably of at least 150 N. The term "tear strength" means the tear strength measured according to ASTM standardized test D1004-66 (reapproved 1981) using a static weighing testing machine.

Fabric 12 preferably extends throughout the whole extended interior (second and third dimensions) of article 10 and is flexible to allow article 10 to be folded or rolled up. Fabric 12 may be of a woven or nonwoven construction and preferably has a porous construction. The term "porous" means the fabric has pores or openings of a size sufficient to permit polymeric layers on opposite sides of the fabric to become bonded to each other. Preferably, at least 20 percent of the fabric is porous, and more preferably 50 to 80 percent of the fabric is porous. The fabric preferably has sufficient thread size and count to allow the multilayered article 10 to demonstrate the preferred values for tensile strength and tear strength. Fabric 12 may be made from many of the materials known in the fabric art. Such materials may include polyester, nylon, polyethylene terephthalate (PET), and polyolefins such as polyethylene, polypropylene, et cetera. Commercially available fabrics that are suitable for use in the article of this invention can be obtained from Milliken, Spartenburg, S.C. (for example, a polyester woven fabric having a knit yarn 70 denier (D), warp 1000 D, fill 1000 D, weight of 2.8 ounces per square yard); JPS Converter and Industrial Corporation, Greenville, S.C.; Apex Mills Corporation, Inwood, N.Y.; and Fiberweb North America Inc., Greenville, S.C. The fabric, of course, should not contain a chlorinated polymer.

Polymeric layers A and A' may be the same or different, but each include a non-chlorinated copolymer that contains ethylene units as a first comonomer. The non-chlorinated copolymer preferably is non-acidic and typically contains 40 to 85 weight percent of ethylene units, and preferably 50 to 75 weight percent ethylene units, and at least one second comonomer. Examples of second comonomers that may be employed in an ethylene copolymer include non-acidic, non-chlorinated, ethylenically unsaturated monofunctional monomers other than ethylene such as vinyl acetate, acrylates such as methyl acrylate, ethyl acrylate, butyl acrylate, and higher $\alpha$ olefins including butene, hexene, and octene, and combinations thereof. Polymeric layers A and A' preferably each possess a significantly high weight percent of the second comonomer. It has been found that there is a direct correlation between the content of the second comonomer in layers A and A' and the degree of flex-crack resistance of the multi-layered article. In general, the second comonomer(s) is present in polymeric layer A or A' in the range of 15 to 60 weight percent, and preferably in the range of 25 to 50 weight percent. Specific examples of copolymers that may be used in polymeric layers A and A' include: poly(ethylene-co-vinyl acetate) (EVA) such as ULTRATHENE and VYNATHENE, Quantum Chemical Co., Cincinnati, Ohio and ELVAX, E. I. Dupont de Nemours, Wilmington, Del.; poly(ethylene-co-methylacrylate) (EMAC); poly(ethylene-co-ethyl acrylate) (EEA) such as ALATHON available from Dupont; poly(ethylene-co-butyl acrylate) such as ENATHENE, Quantum Chemical Co.; a very low density polyethylene (VLDPE) believed to be copolymer of ethylene and hexene such as FLEXOMER, Union Carbide; an ultra low density polyethylene (ULDPE) believed to be a copolymer of ethylene and octene such as ATTANE, Quantum Chemical Co. A preferred copolymer for layer A and A' is EVA having a vinyl acetate content of approximately 40 weight percent.

Polymeric layers A and A' preferably comprise an ethylene copolymer that possesses a relatively low hardness to enable the multi-layered article to have good flexibility and high flex-crack resistance. The Shore A hardness of polymeric layers A and A' is less than 85, and preferably is less than 70. The term "Shore A hardness" means the hardness measured according to ASTM D2240-85 using a Type A durometer. If polymeric layers A and A' are formed by melt extrusion, the copolymer of layers A and A' typically have a melt flow index in the range of 0.5 to 500 grams per 10 minutes (g/10 min.), more typically in the range of 5 to 50 g/10 min. Polymeric layers A and A' preferably extend throughout the extended interior (second and third dimensions) of the multi-layered article.

Polymeric layers B and B' may be the same or different, but each include a non-chlorinated polymer having a Shore A hardness greater than 85, more preferably greater than 90. Polymeric layers B and B' may be secured to layers A and A' by using such techniques as coextrusion, lamination (i.e., bonding layers together under heat and pressure), extrusion coating (i.e., extruding one layer onto the other), and solvent coating to form sheets 14 and 16, respectively. Sheets 14 and 16 can be secured to fabric 12 using lamination or extrusion coating techniques, or any other method capable of providing a good bond thereto.

Polymeric layers B and B' may include: acid functional polymers and copolymers such as poly(ethylene-co-acrylic acid) (EAA), for example, PRIMACOR 3440 available from Dow Chemical Co., Midland, Mich., poly(ethylene-co-methacrylic acid) (EMAA), for example, NUCREL 035 available from E. I. Dupont de Nemours, Wilmington, Del., and ionically crosslinked versions of EMMA such as SURLYN 1706 also available from E. I. Dupont de Nemours, acrylic polymers or copolymers such as NEOCRYL available from ICI Americas of Wilmington, Mass.; polyurethanes such as NEOREZ also available from ICI Americas; polyethylenes such as low density polyethylene (LDPE), nonacidic polyethylene copolymers that contain a high weight percent of ethylene units (>85 weight percent) such as a linear low density polyethylene CLLDPE) and ELVAX 750 a poly(ethylene-co-vinyl acetate) copolymer having greater than 90 weight percent ethylene units available from E. I. Dupont de Nemours; polypropylene; and alkyd resins. Preferred polymers include the acid functional polymers and copolymers and the ionically-crosslinked versions thereof and the polyurethanes. Combinations of the above polymers may also be employed.

Relative to polymeric layers A and A', which tend to be composed of more tacky polymers that have lower hardness, polymeric layers B and B' possess a more tack-free surface of a higher hardness. As layers B and B' are not as tacky and are disposed on the outermost surface of article 10, these layers provide the multi-layered article with relatively good resistance to dirt accumulation (that is, better than layers A and A') and may also provide resistance to weathering. Layers B and B' also may be capable of providing better resistance to dirt accumulation than conventional flexible plasticized PVC materials. Layers B and B', however, may not impart a high degree of flex-crack resistance to the multi-layered articles and thus to preserve the flexibility of the multi-layered article, layers B and B' preferably have a minimum thickness, typically less than the thickness of polymeric layers A and A'. In general, layers B and B' are not more than 30 percent of thickness of the total thickness of duplex sheets 12 and 14, and more preferably not more than 10 percent of the thickness of sheets 12 and 14. The thickness of layers B and B' may be as thin as a molecular layer or about 100 nanometers in thickness, whereas sheets 14 and 16 typically have thicknesses of about 50 to 1,000 micrometers, more typically 100 to 500 micrometers. The thickness of layers B and B' is sufficient to change the surface properties of the resulting article; namely, make the outer surface less tacky than inner layers A and A'.

Figure 2:
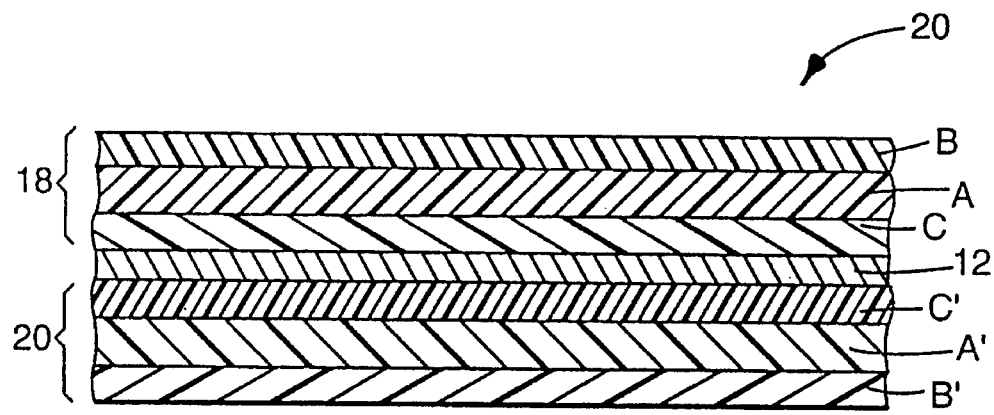
FIG. 2 is a cross section of another embodiment of a multi-layered article 20 in accordance with the present invention.

As shown in FIG. 2, the multi-layered article 20 of this invention may further comprise polymeric layers C and C' secured to layers A and A', respectively, on the side adjacent to fabric 12. Layers C and C' may be the same or different but each have a Shore A hardness greater than 85, preferably greater than 90, and in this regard are similar to layers B and B'. While layers C and C' may be structurally and compositionally similar to layers B and B', the function of layers C and C' is different. Layers C and C' are employed in multi-layered sheets 18 and 20 to allow these sheets to be easy to handle rather than to hinder dirt accumulation on the outer surface of the article 20. Layers A and A' can be tacky or semi-tacky, and by securing layers C and C' thereto, sheets 18 and 20 are rendered less tacky and' easy to handle during processing. Layers C and C', preferably, are made of compatible or similar polymers to promote the securement of sheets 18 and 20 to each other through a porous fabric. Indeed, polymeric layers C and C' may be the same or different from layers B and B', and they may be secured to layers A and A' by similar means. Layers C and C' can be made from the polymers described above for layers B and B', and layers C and C' can have a thickness and provide surface properties similar thereto. Sheets 18 and 20 can have thicknesses similar to sheets 14 and 16 shown in FIG. 1.

Polymeric layers A, A', B, B', C and C' can have a stabilizer incorporated therein to provide good weathering characteristics to the multi-layered article. The stabilizer may include weathering agents, preservatives, antioxidants, or energy quenchers. For instance, hindered amine light stabilizers may be useful to provide good weathering characteristics. The polymeric layers also can have an ultraviolet radiation absorber to protect the multi-layered article from the effects of radiation. Pigments, dyes, or other colorants may be added to the polymeric layers to provide the desired color. In addition, fillers such as calcium carbonate may be added to reduce product cost.

Sheets 14 and 16 or 18 and 20 can be laminated to fabric 12 under heat and pressure so that the polymers in sheets 14 and 16 or 18 and 20 bond to fabric 12. Fabric 12 may possess pores of a size sufficient to enable sheets 14 and 16 or 18 and 20 to become welded or fused to each other. A porous fabric thus can become fully impregnated from both sides by sheets 14 and 16 or 18 and 20.

Multi-layered articles of this invention are particularly suitable for use outdoors. The articles demonstrate good resistance to dirt accumulation and good flex-crack resistance and tear strength—so the articles will not crack excessively under extremely cold conditions and will not tear under normal use. Further, the multi-layered articles of this invention possess other good mechanical properties such as the ability to be sewn or have grommets or other fasteners attached thereto and the ability to resist punctures and tears after having been sewn or having had fasteners attached thereto. Having such properties, the multi-layered articles of this invention are particularly suitable for use as a backing or supporting sheet in a roll-up sign.

Figure 3:
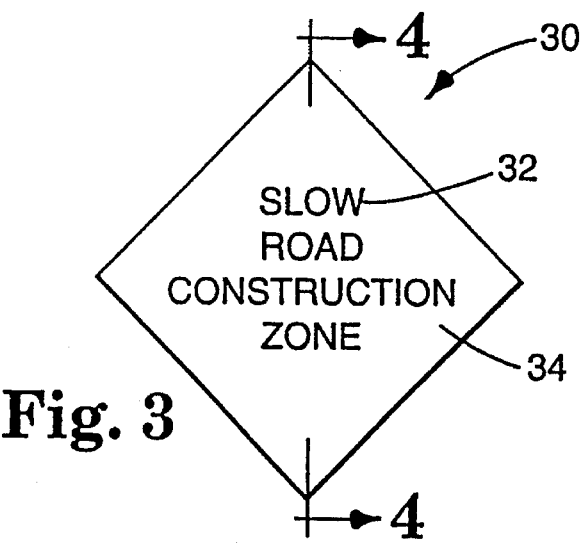
FIG. 3 is a front view of a roll-up sign 30 in accordance with the present invention.

FIG. 3 illustrates a front view of a roll-up sign 30. Roll-up signs are typically used when there is a temporary need to display information to interested persons such as motor vehicle drivers. A roll-up sign therefore often will have an indicia 32 that conveys the needed information to the interested person. The indicia may be placed on a multi-layered article of the invention, or to display the indicia to a passing motorist at nighttime, it may be associated with a retroreflective layer 34 by being disposed thereon or therein. Retroreflective layers have the ability to reflect light back in the direction from which it came and are known in the art as evidenced by U.S. Pat. Nos. 4,767,659, 4,588,258, 3,684, 348, 3,065,559, and 2,407,680, the disclosures of which are incorporated here by reference.

Figure 4:
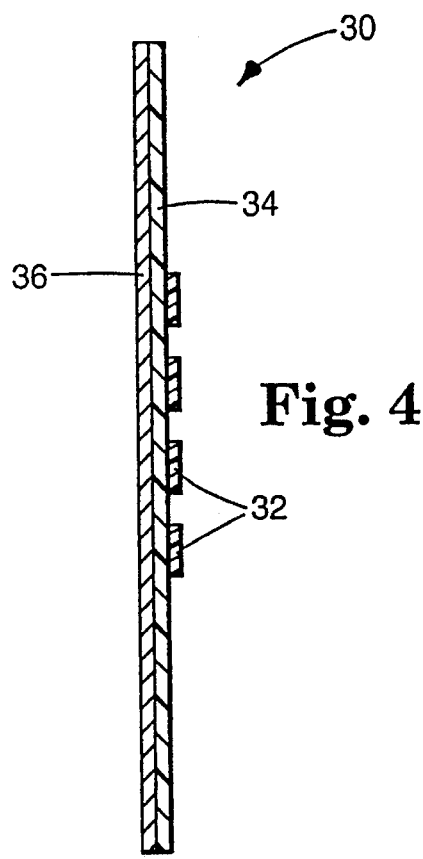
FIG. 4 is a sectional view of a roll-up sign 30 in accordance with the present invention taken along lines 4—4 of FIG. 3.

FIG. 4 shows a side view of a roll-up sign 30 that has a retroreflective layer 34. Retroreflective layer 34 is supported by a backing 36 which can be a multi-layered article of the present invention. Indicia 32 can be associated with the retroreflective layer by placing the indicia on top of the retroreflective layer 34 to block the retroreflection of light therefrom and in this way make the indicia noticeable to a viewer at nighttime. Alternatively, the indicia may be associated with the retroreflective layer by being part of the retroreflective layer, whereby the indicia reflects light of a different color from that of the background to make the indicia noticeable to a viewer. The roll-up sign 30 can be secured to a support, preferably a collapsible supporting apparatus, to allow the sign to be displayed along a highway. Collapsible supporting apparatus are disclosed in, for example, U.S. Pat. Nos. 5,175,646, 4,980,984, 4,694,601,4, 592, 158, and 4,490,934, the disclosures of which are incorporated here by reference.

In addition to being suitable for use as a roll-up sign, the articles of this invention are also suitable for use as a flexible cover for a truck or truck trailer. Covers for trucks and truck trailers need to have good flex-crack resistance properties because the covers flutter excessively in the wind over a wide range of temperatures. See Truck Cover Market Report, *Data Textile* 10–11 (May 1991).

Figure 5:
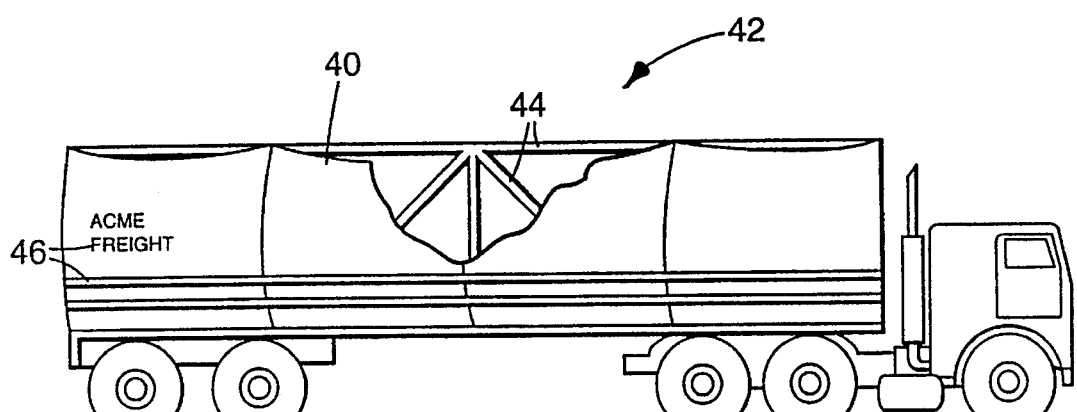
FIG. 5 is a side view of a truck trailer 42 having a flexible truck cover 40 of the present invention secured thereto.

FIG. 5 illustrates a track trailer cover 40 for a truck trailer 42. Truck trailer cover 40 is dimensioned and adapted to be fitted over and secured to the truck trailer 42. The truck trailer cover 40 is supported over the trailer by supporting members 44. A reflective or non-reflective indicia 46 may be placed on truck cover 40 for advertising purposes or to allow trailer 42 to be more readily noticed by other motor vehicle drivers. Although flexible truck trailer covers are not very prominent in the United States, in Europe flexible trailer covers are commonplace, and they frequently are made from plasticized PVC. This invention thus has the potential to substantially lower the usage of such PVC-laminated articles.

Features and advantages of this invention are further illustrated in the following examples. It is to be expressly understood, however, that while the examples serve this purpose, the particular ingredients and amounts used as well as other conditions and details are not to be construed in a manner that would unduly limit the scope of this invention.

EXAMPLES

Example 1

Onto a 0.97 mil (24.25 micrometers) polyethyleneterephthalate (PET) support film was extruded a dual-layered sheet comprising: layer A containing 93.4 parts of VYNATHENE EY 901-25 (a thermoplastic polymer believed to comprise 60 weight percent ethylene monomer and a 40 weight percent vinyl acetate and to have a melt flow index of 7.5 g/min (available from Quantum Chemical Company, Cincinnati, Ohio)), 5 parts of an inorganic pigment, 1.5 parts of a hindered amine light stabilizer and 0.1 parts of a antioxidant; and layer B containing 98.4 parts of PRIMACOR 3440 (a thermoplastic polymer believed to comprise 91 weight percent ethylene monomer and 9 weight percent acrylic acid monomer and believed to have a melt flow index of 10 (available from Dow Chemical, Midland, Mich.)), 1.5 parts of a hindered amine light stabilizer, and 0.1 parts of an antioxidant. A 3.2 cm extruder having a length to diameter (L:D) ratio of 24 to 1 was used for layer A, and a 3.2 cm extruder having a L:D ratio of 30:1 was used for layer B. The temperature profile for the extruder for layer A was 104° C., 152° C., and 216° C. while the temperature profile for the extruder for layer B was 104° C., 127° C., 160° C., 182° C. and 216° C. The dual-layered sheet was coextruded through a feedblock at a temperature of 216° C. into a single layer 6.3 cm die at a temperature of 216° C. with end plates at 216° C. using a single screw extruder. Extruder screw speeds and sheet take-away speeds were adjusted to produce a multi-layered sheet having a thickness of 150 micrometers and a thickness ratio of layer A to layer B (A:B) of 5:1.

The dual-layered sheet was then laminated under heat and pressure to a polyester fabric, 0762 from Milliken & Company, Spartanburg, S. C., believed to be a 9 by 9 round construction (9 strands by 9 strands per inch) having a knit yarn 70 denier (D), warp 1000 D, fill 1000 D, weight of 2.8 ounces per square yard, where layer A of the dual-layered sheet is in contact with the fabric. The lamination was performed at a speed of 6.1 meters per minute between a steel roller heated to 138° C. and a hard rubber nip roll under a pressure of 186 newtons per centimeter (cm) of roll width. The dual-layered sheet was in contact with the steel roller, and the fabric was in contact with the rubber roll. The resultant laminate was then wound upon itself into roll form.

A second layer of dual-layered sheet was then laminated under heat and pressure to the alternate side of the article, where layer A of the dual-layered sheet was in contact with the previously non-contacted side of the polyester fabric. The second lamination was performed at a speed of 26 meters per minute between a steel roller heated to 152° C. and a hard rubber nip roll under a pressure of 216 newtons per em of roll width. The dual-layered sheet was in contact with the steel roll, and the laminate was in contact with the rubber roll. The resulting multi-layered article was then wound upon itself into a roll.

The PET support films were removed by hand from both sides of the multi-layered article and a 10.2 by 25.4 cm sample was placed onto a GELBO FLEX TESTER Model 5000 (available from United States Testing Company Inc., Hoboken, N.J.), in a −25° C. freezer and flexed for 5000 cycles. After flexing, the multi-layered article was removed from the Gelbo Flex Tester and was allowed to return to room temperature. The laminated article then was visually inspected for flex-cracking. This was accomplished by highlighting the outer surface of the laminated article by applying black shoe polish. The results of this visual inspection are set forth below in Table 1.

Example 2

A multi-layered article was made as described in Example 1, except a triplex sheet comprising layers A, B, and C was produced where layer C was the same as layer B. The triplex sheet was made using the same extruders and feedblock, but with a different selector plug to produce the desired polymer arrangement. Extruder screw speeds and sheet take-away speed were adjusted to produce a triplex sheet having a thickness of 150 micrometers and a thickness ratio B:A:C of 1:10:1.

A triplex sheet was laminated to each side of the PET fabric under heat and pressure as described in Example 1, where layer C was in contact with the fabric. The PET support films were removed by hand from both sides of the flexible laminate, and the resulting multi-layered article was tested as described in Example 1. Results of the test are set forth below in Table 1.

Example 3

A multi-layered article was produced as described in Example 1 which contained 93.4 parts of VYNATHENE EY 901-25 (a thermoplastic polymer believed to comprise a 60 weight percent ethylene polymer and a 40 weight percent vinyl acetate polymer and believed to have a melt flow index of 7.5 (available from Quantum Chemical Company)), 5 parts of an inorganic pigment, 1.5 parts of a hindered amine light stabilizer, and 0.1 parts of a antioxidant. Extruder screw speed and sheet take-away speed were adjusted to produce a sheet having a thickness of 150 micrometers. Two layers of the sheet were laminated under heat and pressure as described in Example 1 where the polymer layer was in contact with the fabric.

A PET support film was removed by hand from one side of the flexible laminate, and the flexible laminate was corona treated as 0.39 kilowatts per square meter per minute and was wire bar coated with a solution comprising 75.0 parts NEOREZ R960 (available from Polyvinyl Chemicals Co., believed to comprise water-borne aliphatic urethane), 14.9 parts water, 0.2 parts Witco 3056A bubble breaker, 7.5 parts ethyl alcohol, 0.1 parts of a fluorocarbon leveling agent, and 2.3 parts CX-100 (100 percent active polyfunctional aziridine liquid crosslinker available from Polyvinyl Chemical Co.). The coating was air dried for 10 minutes at room temperature and was then cured for one minute at 130° C. to yield a layer having an approximate dry thickness of 2 micrometers. The remaining PET support layer film was removed by hand. The second side of the laminate layer was corona treated and coated with NEOREZ R 960 as described above. The resulting article was then tested as in Example one. The results of the test are set forth below in Table 1.

Example 4

A multi-layered article was produced in a manner similar to the method described in Example 1. Layer A contained 93.4 parts of ethylene normal butylacrylate (EnBA) 89821 (a thermoplastic polymer believed to comprise a 65 weight percent ethylene monomer and a 35 weight percent normal butyl acrylate, and believed to have a melt flow index of 110 (available from Quantum Chemical Company), 1.5 parts hindered amine, 0.1 parts of an antioxidant, and 5 parts of an inorganic pigment. Layer B contained 98.4 parts Nucrel 699 (a thermoplastic believed to comprise 89 weight percent ethylene monomer and 11 weight percent methacrylic acid having a melt index of 100 from DuPont), 1.5 parts hindered amine, and 0.1 parts antioxidant. The temperature profile of the extruder for layer A was 93° C., 99° C., 116°, 132° C., and 149° C., and for layer B was 93° C., 121° C., and 149° C. The dual-layered sheet was co-extruded through a feedblock at a temperature of 149° C. into a single layer 6.3 cm die at a temperature of 149° C. with end plates at 149° C. Extruder screw speeds and sheet takeaway speed were adjusted to produce a dual-layered sheet having a thickness of 150 micrometers and a thickness ratio of A:B of 5:1. The dual-layered sheets were secured to the fabric described in Example 1 in a similar manner. The multi-layered article was tested as described in Example 1. The results of the test are set forth below in Table 1.

Example 5 (Comparative)

A multi-layered article was produced as described in Example 1, except a single layer sheet was used which comprised 93.4 parts of PRIMACOR 3440, an ethylene acrylic acid copolymer; 5 parts of an inorganic pigment, 1.5 parts of a hindered amine light stabilizer, and 0.1 parts of an antioxidant. A 3.2 cm extruder (L:D=24:1 was used to extrude the layer. The temperature profile for the extruder was 104° C., 152° C., and 216° C. The single layer sheet was extruded through a single layer 6.4 cm die at a temperature of 216° C., with end plates at 216° C. Extruder screw speed and sheet take-away speed were adjusted to produce a sheet having a thickness of 150 micrometers. The sheet was secured to the fabric as described in Example 1. The resulting multi-layered article was tested for flex crack resistance, and the results are set forth below in Table 1.

Example 6 (Comparative)

A flexible fabric was purchased from Industrial Fabrics Corporation, Minneapolis, Minn., which was sold under the name DURASKIN and is believed to be comprised of two plasticized PVC layers and a woven fabric. The PVC layers are disposed on opposite sides of the woven fabric. A sample of same size as Example 1 was tested as described in Example 1 for flex crack resistance, and the results of the test are set forth below in Table 1.

TABLE 1

| Example | Flex Crack Resistance |
| --- | --- |
| 1 | No Flex Cracking |
| 2 | No Flex Cracking |
| 3 | No Flex Cracking |
| 4 | No Flex Cracking |
| 5* | Numerous Cracks Observed |
| 6* | No Flex Cracking |

*Comparative Example

The results set forth in Table 1 show that multilayered articles of this invention demonstrate good flex crack resistance under cold conditions. The articles of the present invention (Examples 1–4) performed as good as the PVC-containing article of Example 6.

Various modifications and alterations of this invention will become apparent to those skilled in the art without departing from the scope and spirit of this invention. It therefore should be understood that this invention is not to be unduly limited to the illustrated embodiments set forth above but is to be controlled by the limitations set forth in the claims and any equivalents thereof.

What is claimed is:

1. A truck trailer cover that comprises:
   a multi-layered article dimensioned and adapted to be fitted over and secured to a truck trailer, the multi-layered article comprising:
   (a) a fabric having first and second sides; and
   (b) a first sheet disposed on the first side of the fabric, and a second sheet disposed on the second side of the fabric, the first sheet comprising polymeric layers A and B and the second sheet comprising polymeric layers A' and B', wherein:
   polymeric layers A and A' each include a non-chlorinated, copolymer that contains ethylene units and has a Shore A hardness less than 85;
   polymeric layers B and B' each include a non-chlorinated polymer having a Shore A hardness greater than 85; and
   polymeric layers A and A' are disposed between the fabric and layers B and B', respectively.

2. The truck trailer cover of claim 1, wherein the fabric of the backing is porous and the first and second sheets are secured to each other through pores in the fabric.

3. The truck trailer cover of claim 1, wherein the article is 100 to 2,000 micrometers thick.

4. The truck trailer cover of claim 3, wherein the article is 200 to 1,000 micrometers thick.

5. The truck trailer cover of claim 1 having a tensile strength in the range of 100 to 2,000 Newtons, and having a tear strength of at least 50 Newtons.

6. The truck trailer cover of claim 5 having a tensile strength exceeding 400 Newtons, and having a tear strength of at least 150 Newtons.

7. The truck trailer cover of claim 2, wherein at least 20 percent of the fabric is porous.

8. The truck trailer cover of claim 7, wherein 50 to 80 percent of the fabric is porous.

9. The truck trailer cover of claim 1, wherein polymeric layers A and A' each include a non-chlorinated copolymer that contains 40 to 85 weight percent ethylene units.

10. The truck trailer cover of claim 9, wherein the non-chlorinated copolymer of layers A and A' contains 15 to 60 weight percent of ethylenically unsaturated monofunctional units other than ethylene.

11. The truck trailer cover of claim 10, wherein the ethylenically unsaturated monofunctional units are selected from the group consisting of vinyl acetate, methyl acrylate, ethyl acrylate, butyl acrylate, butene, hexene, and octene.

12. The truck trailer cover of claim 11, wherein the ethylenically unsaturated monofunctional monomer is present in polymeric layer A or A' in the range of 25 to 50 weight percent.

13. The truck trailer cover of claim 1, wherein the Shore A hardness of polymeric layers A and A' is less than 70, and wherein polymeric layers B and B' have a Shore A hardness of greater than 90.

14. The truck trailer cover of claim 1, wherein polymeric layers B and B' include polymers selected from the group consisting of acid functional polymers and copolymers and ionically cross-linked versions thereof, polyurethanes, polyethylenes, ethylene copolymers that contain greater than 85 weight percent ethylene units, polypropylenes, alkyd resins, and combinations thereof.

15. The truck trailer cover of claim 14, wherein polymeric layers B and B' include acid functional polymers and copolymers, ionically cross-linked versions of acid functional polymers and copolymers, polyurethanes, and combinations thereof.

16. The truck trailer cover of claim, 1, wherein layers B and B' have a thickness less than the thickness of polymeric layers A and A', respectively.

17. The truck trailer cover of claim 1, wherein layers B and B' are not more than 30 percent of the total thickness of the first and second sheets, respectively.

18. The truck trailer cover of claim 1, wherein the first and second sheets have a thickness of about 50 to 1,000 micrometers, and layers B and B' have a thickness that is not more than 10 percent of the thickness of the first and second sheets, respectively.

19. The truck trailer cover of claim 1, wherein the first sheet further comprises a polymeric layer C and the second sheet further comprises a polymeric layer C', polymeric layers C and C' each include a non-chlorinated polymer having a Shore A hardness greater than 85 and are secured to the polymeric layers A and A' on a side opposite to polymeric layers B and B', respectively.

20. The truck trailer cover of claim 1, having a thickness of 200 to 1,000 micrometers, a tensile strength in the range of 400 to 2,000 Newtons, a tear strength of at least 150 Newtons, and wherein the fabric is porous, polymeric layers A and A' contain 50 to 75 weight percent ethylene units and 25 to 50 weight percent units selected from the group consisting of vinyl acetate, methyl acrylate, ethyl acrylate, butyl acrylate, butene, hexene, octene, and combinations thereof, the polymeric layers A and A' have a Shore A hardness less than 70, polymeric layers B and B' have a Shore A hardness greater than 90 and are selected from the group consisting of acid functional polymers and copolymers, ionically crosslinked versions of acid functional polymers and copolymers, polyurethanes, and combinations thereof, and layers B and B' having a thickness less than the thickness of polymeric layers A and A'.

* * * * *

UNITED STATES PATENT AND TRADEMARK OFFICE
CERTIFICATE OF CORRECTION

PATENT NO. : 5,491,021
DATED : February 13, 1996
INVENTOR(S) : Howard R. Tolliver and Terry R. Bailey It is certified that error appears in the above-indentified patent and that said Letters Patent is hereby corrected as shown below:

Col. 8, line 5, "yam" should be --yarn--.

Col. 8, line 21, "em" should be --cm--.

Col. 8, line 62, "polymer" should be --monomer--.

Col. 8, line 63, "polymer" should be --monomer--.

Signed and Sealed this

Eleventh Day of June, 1996

Attest:

BRUCE LEHMAN

*Attesting Officer*      *Commissioner of Patents and Trademarks*